US012194572B2

(12) United States Patent
Usui et al.

(10) Patent No.: US 12,194,572 B2
(45) Date of Patent: Jan. 14, 2025

(54) ULTRASONIC WELDING DIAGNOSTIC METHOD, JOINING METHOD OF WELDING MEMBER, AND INSPECTION DEVICE

(71) Applicant: KABUSHIKI KAISHA TOSHIBA, Tokyo (JP)

(72) Inventors: Takashi Usui, Saitama (JP); Keisuke Ueno, Kanagawa (JP); Mamoru Shibuya, Niigata (JP); Souichi Hanafusa, Niigata (JP); Tatsuhiko Sakaguchi, Niigata (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 157 days.

(21) Appl. No.: 17/897,567

(22) Filed: Aug. 29, 2022

(65) Prior Publication Data
US 2023/0294214 A1 Sep. 21, 2023

(30) Foreign Application Priority Data
Mar. 18, 2022 (JP) .................................. 2022-044692

(51) Int. Cl.
*B23K 31/12* (2006.01)
*B23K 20/10* (2006.01)
(Continued)

(52) U.S. Cl.
CPC ............ *B23K 31/125* (2013.01); *B23K 20/10* (2013.01); *G01N 29/043* (2013.01); *B23K 31/006* (2013.01); *G01N 2291/267* (2013.01)

(58) Field of Classification Search
None
See application file for complete search history.

(56) References Cited

U.S. PATENT DOCUMENTS 4,419,562 A * 12/1983 Jon .................. B23K 26/03
228/104
8,091,426 B2 * 1/2012 Komatsu ............ G01N 29/4445
73/602
(Continued)

FOREIGN PATENT DOCUMENTS

JP    H5-115986 A     5/1993
JP    2000074887 A *  3/2000 ............. G01N 29/11
(Continued)

OTHER PUBLICATIONS

Foreign (Year: 2000).*
(Continued)

*Primary Examiner* — Devang R Patel
(74) *Attorney, Agent, or Firm* — Finnegan, Henderson, Farabow, Garrett & Dunner, LLP

(57) ABSTRACT

An ultrasonic welding diagnostic method includes: applying a pressing force to an object to be joined so as to generate a surface pressure on a joint surface of the object to be joined; inputting ultrasonic waves to the joint surface; detecting an elastic wave propagating through the object to be joined by at least one sensor at a plurality of different positions; analyzing a signal detected by the sensor to generate an envelope of the signal and calculating information about the envelope; and determining a joint state on the joint surface based on the calculation result of the information.

18 Claims, 8 Drawing Sheets

(51) Int. Cl.
*G01N 29/04* (2006.01)
*B23K 31/00* (2006.01)

(56) References Cited

U.S. PATENT DOCUMENTS

| | | | | |
|---|---|---|---|---|
| 2003/0218050 | A1* | 11/2003 | Kanemoto | B23K 20/005 |
| | | | | 228/103 |
| 2012/0011934 | A1 | 1/2012 | Matsui et al. | |
| 2015/0369779 | A1* | 12/2015 | Kawamoto | B23K 31/125 |
| | | | | 73/588 |
| 2020/0035642 | A1 | 1/2020 | Egusa et al. | |
| 2023/0020518 | A1* | 1/2023 | Chiba | B25J 9/1679 |

FOREIGN PATENT DOCUMENTS

| | | | | |
|---|---|---|---|---|
| JP | 2001276980 | A | * 10/2001 | B23K 11/252 |
| JP | 2002202292 | A | * 7/2002 | |
| JP | 2004-58523 | A | 2/2004 | |
| JP | 6742448 | B2 | 8/2020 | |
| JP | 2022-132596 | A | 9/2022 | |
| WO | WO 2010/113250 | A1 | 10/2010 | |
| WO | WO 2018/143410 | A1 | 8/2018 | |

OTHER PUBLICATIONS

Foreign (Year: 2001).*
Foreign (Year: 2002).*
L. M. Brekhovskikh, "Waves in Layered Media," New York: Academic Press, 1960.
Electronics Bonding Technology Editorial Committee, Electronics Bonding Technology, Industry Research Committee, "Chapter 5 Ultrasonic bonding," pp. 125-137 (1994).
Japan Patent Office, Office Action in JP App. No. 2022-044692, 7 pages, and machine translation, 6 pages (Sep. 10, 2024).

* cited by examiner (A)

(B)

(C)

ULTRASONIC WELDING DIAGNOSTIC METHOD, JOINING METHOD OF WELDING MEMBER, AND INSPECTION DEVICE

CROSS-REFERENCE TO RELATED APPLICATION

This application is based upon and claims the benefit of priority from Japanese Patent Application No. 2022-044692, filed Mar. 18, 2022 the entire contents of which are incorporated herein by reference.

FIELD

Embodiments described herein relate generally to an ultrasonic welding diagnostic method, a joining method of a welding member, and an inspection device.

BACKGROUND

A welding method using ultrasonic waves for joining members of metal materials is known. Ultrasonic welding is a welding method that utilizes a phenomenon of joining by interatomic force by inputting vibration by ultrasonic waves to an interface (joint surface) of an object to be joined such as metal, so that the metals at the interface approach each other to an interatomic distance based on a frictional force generated at an interface joint surface of the member. In ultrasonic welding, it may be difficult to grasp a welding state on the joint surface of the member in real time.

DETAILED DESCRIPTION

Figure 1:
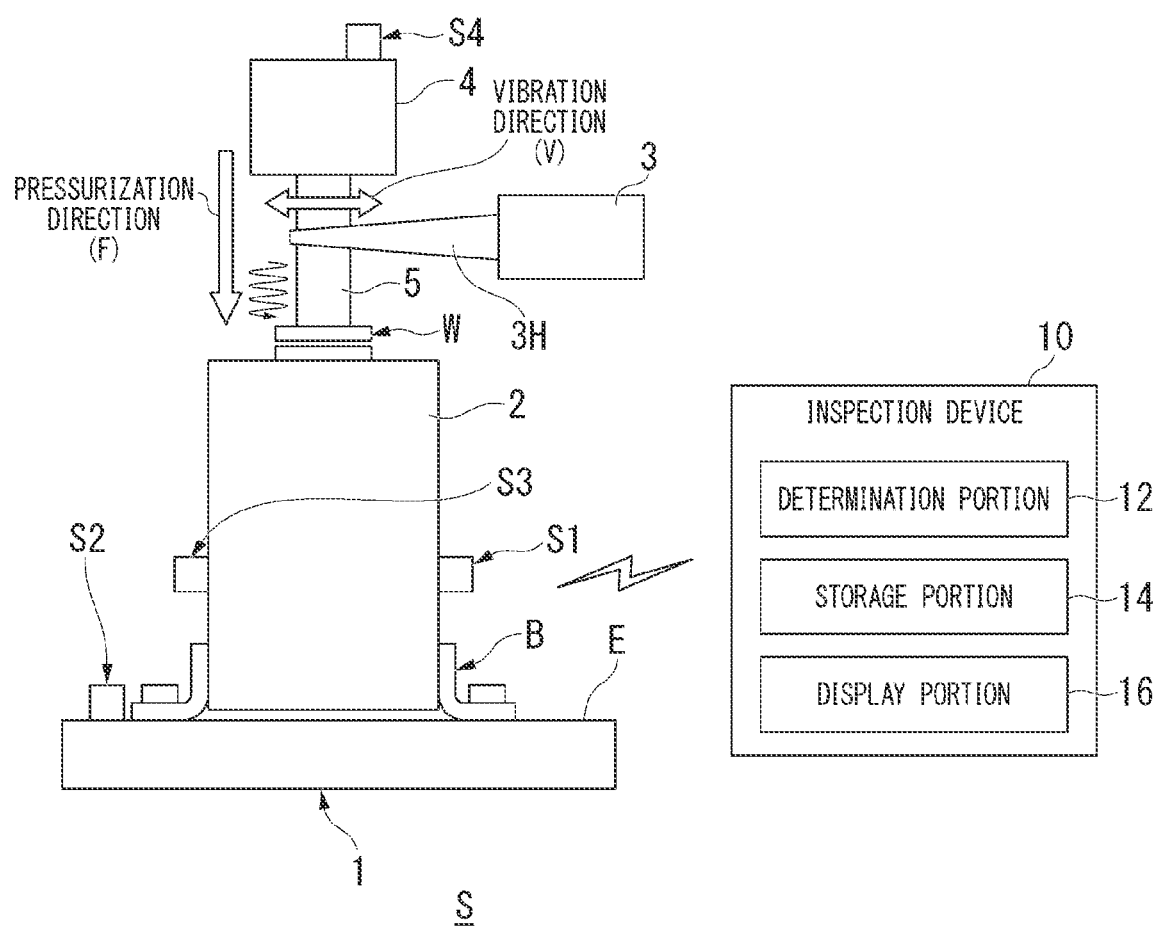
FIG. 1 is a diagram schematically showing a configuration of an ultrasonic diagnostic system according to an embodiment.

According to one embodiment, an ultrasonic welding diagnostic method includes: applying a pressing force to an object to be joined so as to generate a surface pressure on a joint surface of the object to be joined; inputting ultrasonic waves to the joint surface; detecting an elastic wave propagating through the object to be joined by at least one sensor at a plurality of different positions; analyzing a signal detected by the sensor to generate an envelope of the signal and calculating information about the envelope; and determining a joint state on the joint surface based on the calculation result of the information.

According to one embodiment, in a joining method of a welding member, a computer executes the steps of; applying a pressing force to an object to be joined so as to generate a surface pressure on a joint surface of the object to be joined; inputting an ultrasonic wave to the joint surface; detecting an elastic wave propagating through the object to be joined by at least one sensor at a plurality of different positions; generating an envelope of the signal detected by the sensor based on analysis of the signal, and calculating information about the envelope; determining a joint state on the joint surface based on a calculation result of the information; and extracting the object to be joined after joining, which is the joint state that meets a predetermined threshold value based on a determination result.

According to one embodiment, an inspection device for ultrasonic welding in which a pressing force is applied to an object to be joined so as to generate a surface pressure on a joint surface of the object to be joined, an ultrasonic wave is input to the joint surface, and an elastic wave propagating through the object to be joined is detected at a plurality of different positions by at least one sensor; includes: a determination portion that generates an envelope of a signal detected by the sensor based on analysis of the signal, calculates information about the envelope, and determines a joint state on the joint surface based on a calculation result of the information.

According to one embodiment, in a non-transitory computer-readable storage medium having computer program instructions for ultrasonic welding in which a pressing force is applied to an object to be joined so as to generate a surface pressure on a joint surface of the object to be joined, an ultrasonic wave is input to the joint surface, and an elastic wave propagating through the object to be joined is detected at a plurality of different positions by at least one sensor, the computer program instructions, when executed, cause a computer to: analyze a signal detected by the sensor; generate an envelope of the signal based on an analysis result; calculate information about the envelope; and determine a joint state on the joint surface based on a calculation result of the information.

Hereinafter, an ultrasonic welding diagnostic method, a joining method of a welding member, and an inspection device of an embodiment will be described with reference to the drawings.

As shown in FIG. 1, an ultrasonic diagnostic system S includes, for example, an ultrasonic welding device 1 that ultrasonically welds an object W to be joined, and an inspection device 10 that inspects a welding state of the object W to be joined. The object W to be joined is, for example, two metal members, and planar joint surfaces are in contact with each other. The object W to be joined is, for example, a pair of metal plates used for electrodes and the like. The ultrasonic welding device 1 includes, for example, an anvil 2 (first housing) installed on a fixed pedestal E provided on a floor surface, a pressurizing portion 5 provided above the anvil 2, and an ultrasonic wave generator 3 that inputs ultrasonic wave vibration to the pressurizing portion 5.

The anvil 2 is a pedestal on which the object W to be joined is placed on an upper surface. The anvil 2 is fixed on the fixed pedestal E via a fixing member B. The fixed pedestal E is provided separately from the anvil 2 that supports the object W to be joined, and is in mechanical contact with the anvil 2 via the fixing member B. The pressurizing portion 5 is provided above the anvil 2. The pressurizing portion 5 is movable in a vertical direction. The pressurizing portion 5 is driven by a drive portion 4 (second housing) including a drive source that generates a downward pressing force. The drive portion 4 has a drive source such as a hydraulic jack and is fixed to the anvil 2. The drive portion 4 may be fixed to another position such as the fixed pedestal E. The drive portion 4 is provided separately from the pressurizing portion 5. The drive portion 4 holds the pressurizing portion 5 via a fixing member (not shown) or the like, and is in mechanical contact with the pressurizing portion 5.

The pressurizing portion 5 cooperates with the upper surface of the anvil 2 to sandwich the object W to be joined along the vertical direction. The pressurizing portion 5 generates a pressing force in a direction in which the joint surfaces of the object W to be joined are brought into contact with each other. The pressurizing portion 5 applies a pressing force to the object W to be joined so as to generate a surface pressure on the joint surface of the object W to be joined. A horn 3H provided in the ultrasonic wave generator 3 is connected to the pressurizing portion 5. The horn 3H is a member that transmits ultrasonic vibration generated by the ultrasonic wave generator 3 to the pressurizing portion 5. The horn 3H transmits, for example, horizontal ultrasonic vibration to the pressurizing portion 5.

The ultrasonic wave generator 3 is, for example, a device that inputs an AC voltage having an ultrasonic frequency to a piezoelectric element provided inside to generate ultrasonic vibration. The ultrasonic wave generator 3 may apply a magnetic field having an ultrasonic frequency to a magnetic material to generate ultrasonic vibration based on the magnetostrictive effect. The ultrasonic wave generator 3 may generate ultrasonic vibration using a photoelectric element that vibrates based on the photoelectric effect. The ultrasonic wave generator 3 vibrates the pressurizing portion 5 in the horizontal direction via the horn 3H, inputs ultrasonic waves to the joint surface of the object W to be joined, and welds the joint surface.

The ultrasonic welding device 1 is provided with at least one sensor that detects elastic waves transmitted through the object W to be joined. The sensor may be composed of, for example, an AE (Acoustic Emission) sensor capable of detecting the movement of a member due to an elastic wave, an acceleration sensor, a vibration sensor, or the like, and other sensors may be used. The sensor may be a MEMS (Micro Electro Mechanical Systems) acceleration sensor or a MEMS AE sensor. The sensor can be applied to any vibration generation principle such as a piezoelectric element, a capacitance type, and an optical type of the ultrasonic wave generator 3.

The sensors are provided at a plurality of different positions in the ultrasonic welding device 1. For example, a sensor is provided in the anvil 2 in order to detect an elastic wave transmitted through the object W to be joined. A first sensor S1 is provided on one side surface side of the anvil 2. A third sensor S3 is provided on the other side surface side of the anvil 2. In the fixed pedestal E, a second sensor S2 is provided in the vicinity of the fixing member B for fixing the anvil 2. The second sensor S2 detects an elastic wave propagating from the anvil 2 to the fixed pedestal E. In the anvil 2, elastic waves may be reflected multiple times and the detection signal may be disturbed.

The second sensor S2 is provided on the fixed pedestal E separated from the anvil 2, can detect the elastic wave propagating in the anvil 2, and can reduce the influence of the elastic wave repeatedly reflected in the anvil 2. Further, the drive portion 4 is provided with a fourth sensor S4. The fourth sensor S4 detects the reflected wave of the elastic wave generated from the object W to be joined. The drive portion 4 is provided in a housing provided in a separate body different from the pressurizing portion, is in mechanical contact with the pressurizing portion 5, and is not in mechanical contact with the object W to be joined.

The fourth sensor S4 can detect the reflected wave of the elastic wave generated from the object W to be joined and propagated from the pressurized portion to the second housing. According to the fourth sensor S4, it is possible to detect the reflected wave of the elastic wave whose relationship between the progress of the welding process and the magnitude of the signal is reversed, and it is possible to detect the welding process like other sensors.

The elastic wave transmitted through the object W to be joined is analyzed by the inspection device 10. The inspection device 10 is connected to the ultrasonic welding device 1 by wire or wirelessly so as to be communicable. The inspection device 10 may be connected to the ultrasonic welding device 1 through a network.

The inspection device 10 is composed of, for example, an information-processing terminal device such as a personal computer. The inspection device 10 includes, for example, a determination portion 12 that analyzes detection data acquired from a sensor, a storage portion 14 that stores data necessary for analysis, and a display portion 16 that displays analysis results. The determination portion 12 acquires detection data from at least one sensor provided in the ultrasonic welding device 1, and determines the joint state on the joint surface of the object W to be joined based on the analysis of the signal detected by the sensor. The determination portion 12 determines the joint state on the joint surface of the object W to be joined based on a preset analysis method described later.

For example, in a state where the pressure is applied to the joint object so as to generate a surface pressure on the joint surface of the joint object in the ultrasonic welding device 1, when ultrasonic waves are input to the joint surface, the determination portion 12 determines the joint state on the joint surface of the object W to be joined. For example, in ultrasonic welding, the determination portion 12 analyzes the signal of the elastic wave propagating through the object W to be joined detected by the plurality of sensors at a plurality of different positions.

The determination portion 12 generates a signal envelope based on the analysis of the signal detected by the sensor, and calculates information about the envelope. The determination portion 12 determines the joint state on the joint surface based on the calculation result of the information. The information about the envelope is, for example, the shape of the envelope and a plurality of parameters included in the feature amount calculated based on the shape. The determination portion 12 outputs at least one of the joint state of the object W to be joined, the joining strength, and the waveform feature amount of the envelope based on the signal detected by the sensor.

For example, the determination portion 12 executes machine learning using a neural network in advance based on the teacher data regarding the envelope corresponding to the joint state, compares the detected data with the teacher data, and determines the joint state on the joint surface. The detailed contents of the analysis method will be described later. The determination portion 12 may change at least one control parameter of the welding time at the input of ultrasonic waves, the output amount, and the adjustment amount of the pressing force at the input of the surface pressure based on the determination result of the joint state, to feedback control the welding control of the ultrasonic welding device 1.

The storage portion 14 stores, for example, an arithmetic expression required for analysis of the determination portion 12, teacher data necessary for analysis, and the like. The storage portion 14 is a storage median such as a hard disk drive (HDD) or a flash memory. The storage portion 14 may be built in the inspection device 10 or may be externally connected. The storage portion 14 may be a data-storable server connected via a network.

The display portion 16 is a display device composed of, for example, a liquid crystal display, a touch panel, or the like. The display portion 16 displays the display image generated by the determination portion 12.

Next, the principle of the ultrasonic welding method will be explained. Ultrasonic welding systems are generally classified into Wedge-Reed type and Lateral Drive type depending on the device configuration. In the Wedge-Reed type, vibration from the piezoelectric element is applied through wedges arranged so as to be orthogonal to Reed driven in the vertical direction. As a result, vibration in the shear direction is generated in the work, and welding is performed. The Wedge-Reed type consists of a piezoelectric transducer driven by a high-frequency driver, a vibration amplification mechanism (horn), and a pressure cylinder. The ultrasonic welding device 1 of the present embodiment is the Wedge-Reed type. The Wedge-Reed type is used for welding a relatively thick material.

The Lateral Drive type has a structure similar to that of the Wedge-Reed type rotated by 90°, and the weld tip has a cantilever structure. Due to its low clamping pressure, it is used with relatively thin samples. The ultrasonic welding device 1 may be configured as a Lateral Drive type.

Welding conditions for ultrasonic welding are determined based on the main parameters shown in frequency (f), vibration velocity (V), clamp pressure (pressing pressure) (F), power (P), energy (E), and time (T). Each parameter has a relationship shown in the following equations (1) and (2).

$$E = P \times T \quad (1)$$

$$P = F \times V \quad (2)$$

Further, the vibration velocity V is determined by the frequency f and the vibration amplitude A. The vibration amplitude range is on the order of 30-60 µm. The frequency is often in the range of 15-75 kHz, and 20 kHz is generally used in particular. Further, the energy E required for joining is said to have a relationship represented by the following formula (3) by using the Vickers hardness H of the sample, the sheet thickness t and the constant K based on the material properties.

$$E = K(Ht)^{3/2} \quad (3)$$

As an example, the configurable parameters are energy (E), power (P), pressure (F), and when the frequency is fixed (20 kHz), other accompanying parameters (vibration amplitude A and time T) are determined based on the above relational expression.

Figure 2:
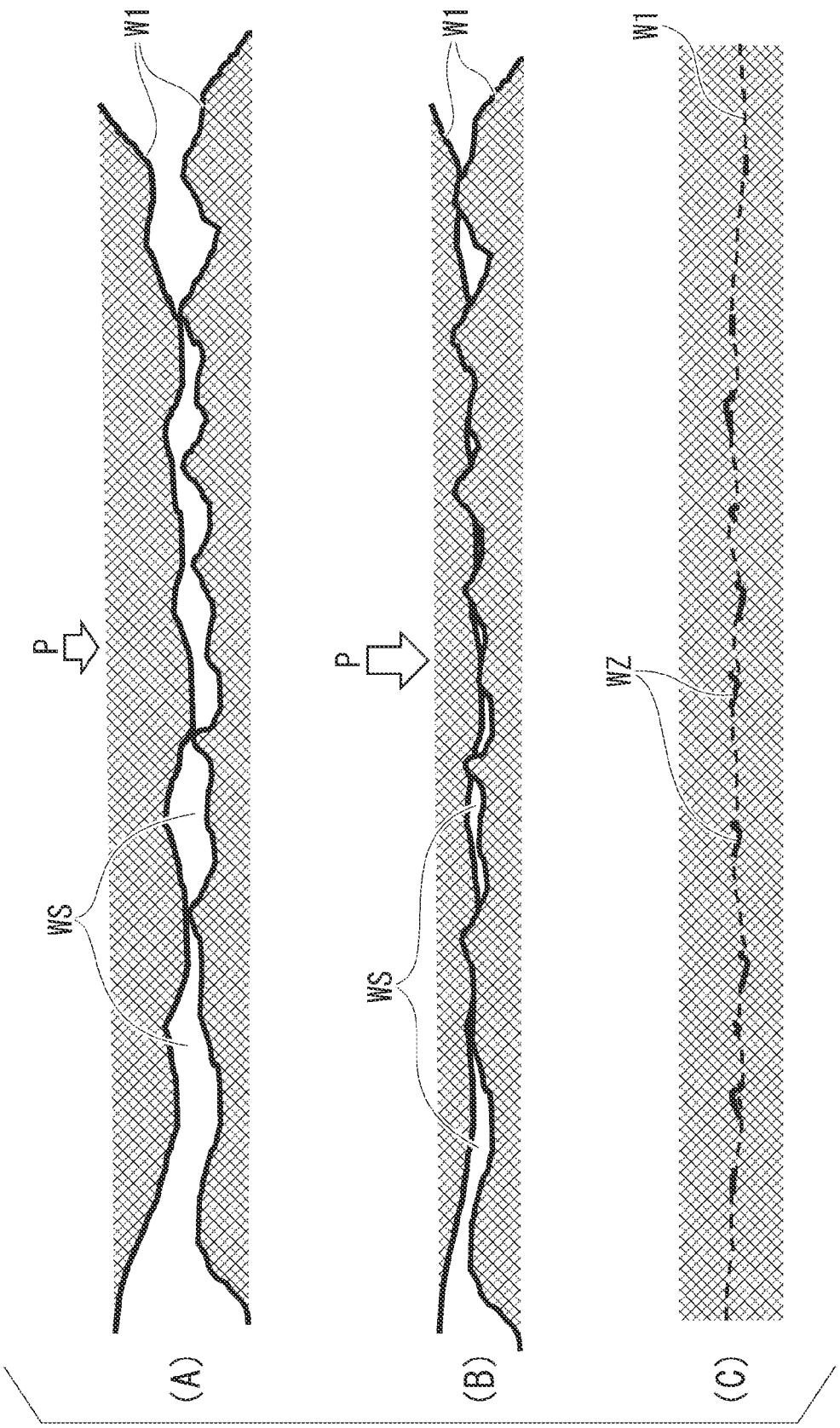
FIG. 2 is a diagram showing a principle of ultrasonic welding of the embodiment.

FIG. 2 shows the general joining process of ultrasonic welding. In ultrasonic welding, ultrasonic vibration is input to the joint surface in a state where a pressure perpendicular to the joint surface W1 of the object W to be joined in which a plurality of metals are stacked is applied to join the metals. When the opposing joint surfaces W1 of the metal object W to be joined to which the static load P is applied come into contact with each other, a gap WS exists on the contact surfaces of the joint surfaces W1 (see FIG. 2(A)). When ultrasonic waves are input parallel to the joint surface W1, the oxides formed on the metal surface are destroyed by friction, the joint surfaces W1 are mechanically smoothed by friction, and a void WS is reduced (see FIG. 2(B)).

In this state, the joint surface W1 is plastically deformed by friction, and the metals on the joint surface W1 approach each other to the interatomic distance (for example, about 0.29 nm in the case of aluminum), so that an interatomic force acts between the metal atoms on the joint surfaces W1, and the joining is performed with the solid phase (see FIG. 2(C)). As shown, WZ represents an oxide destroyed by friction. Here, in order to examine the characteristics of transmitted elastic waves, elastic wave propagation in voids sandwiched between metals is considered.

Figure 3:
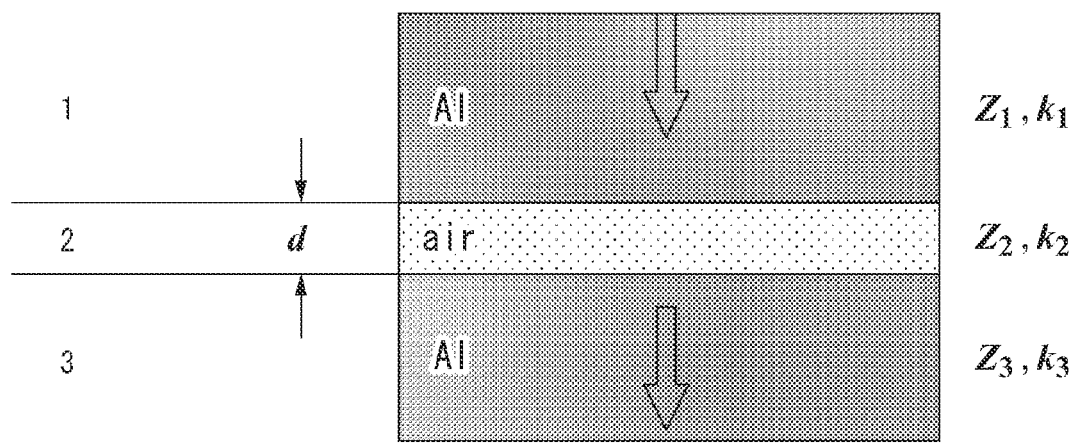
FIG. 3 is a diagram modeling an object to be joined according to the embodiment.

As shown in FIG. 3, for simplification of the discussion, a model of the object W (e.g., aluminum) to be joined composed of three regions 1, 2, 3 (acoustic impedance $Z_1$, $Z_2$, $Z_3$, wave number $k_1$, $k_2$, $k_3$, respectively) is considered. In this model, for example, a gap (acoustic impedance $Z_2$) having a thickness d exists between two metals (acoustic impedance $Z_1$ and $Z_3$). When d is sufficiently small, the apparent impedance Zq when the region 1 to the region 2 are viewed is expressed by the following equation (4) based on the Impedance-translation theorem.

$$Z_q = Z_2 \frac{Z_3 - iZ_2 \tan(k_2 d)}{Z_2 - iZ_3 \tan(k_2 d)} \quad (4)$$

Assuming that the object W to be joined is a pair of homologous metals ($Z_1 = Z_3$), the reflectance coefficient R in the wave input from the region 1 to the region 2 is expressed by the following equation (5).

$$R = \frac{Z_q - Z_1}{Z_q + Z_1} \quad (5)$$

By substituting the equation (3) into the equation (5), the equation (6) is obtained.

$$R = \frac{\tan(k_2 d)(Z_2^2 - Z_1^2)}{\tan(k_2 d)(Z_2^2 + Z_1^2) + 2iZ_1 Z_2} \quad (6)$$

If the reflection intensity is |R|, the following (7) can be obtained.

$$|R| = \frac{\gamma \sin(k_2 d)}{\sqrt{(\gamma \sin(k_2 d))^2 + 1}} = \frac{\gamma \sin(2\pi f d/v)}{\sqrt{(\gamma \sin(2\pi f d/v))^2 + 1}} \quad (7)$$

$$\gamma = \frac{1}{2}\left|\left(\frac{Z_2}{Z_1}\right)^2 - \left(\frac{Z_1}{Z_2}\right)^2\right|$$

At this time, the transmission strength |T| is represented by the following equation (8).

$$|T| = \sqrt{1 - |R|^2} \quad (8)$$

Aluminum is used as the metal to be joined, and the frequency of the input ultrasonic wave is set to the fundamental frequency of 20 kHz used for ultrasonic welding.

Figure 4:
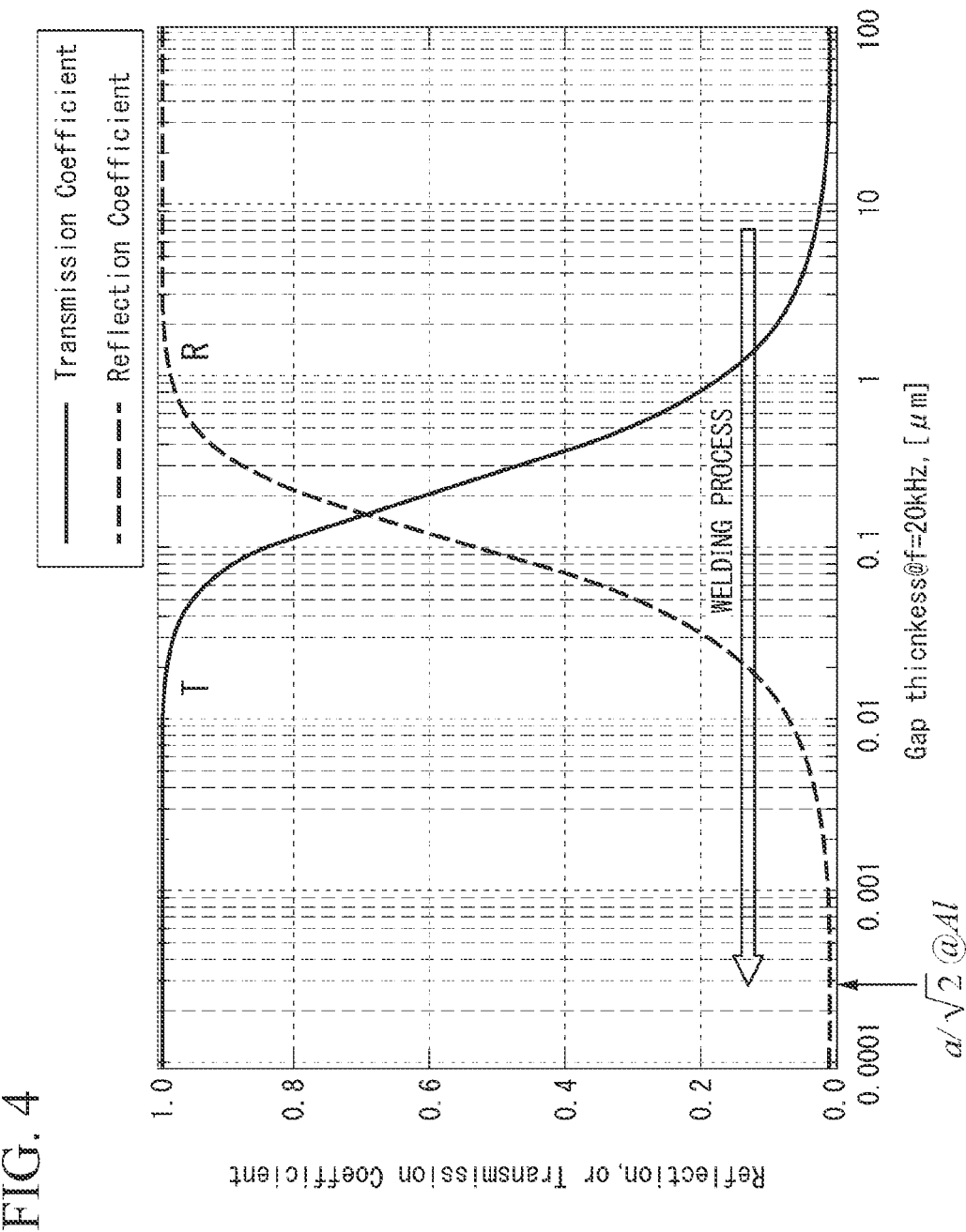
FIG. 4 is a diagram showing a relationship between reflection intensity and transmission intensity of ultrasonic waves and porosity of the embodiment.

As shown in FIG. 4, it can be seen that the relationship between the reflection intensity and the transmission intensity is such that the void of about 0.1 μm to 1 μm is the boundary between the reflection and the transmission when the horizontal axis is the void thickness.

Figure 5:
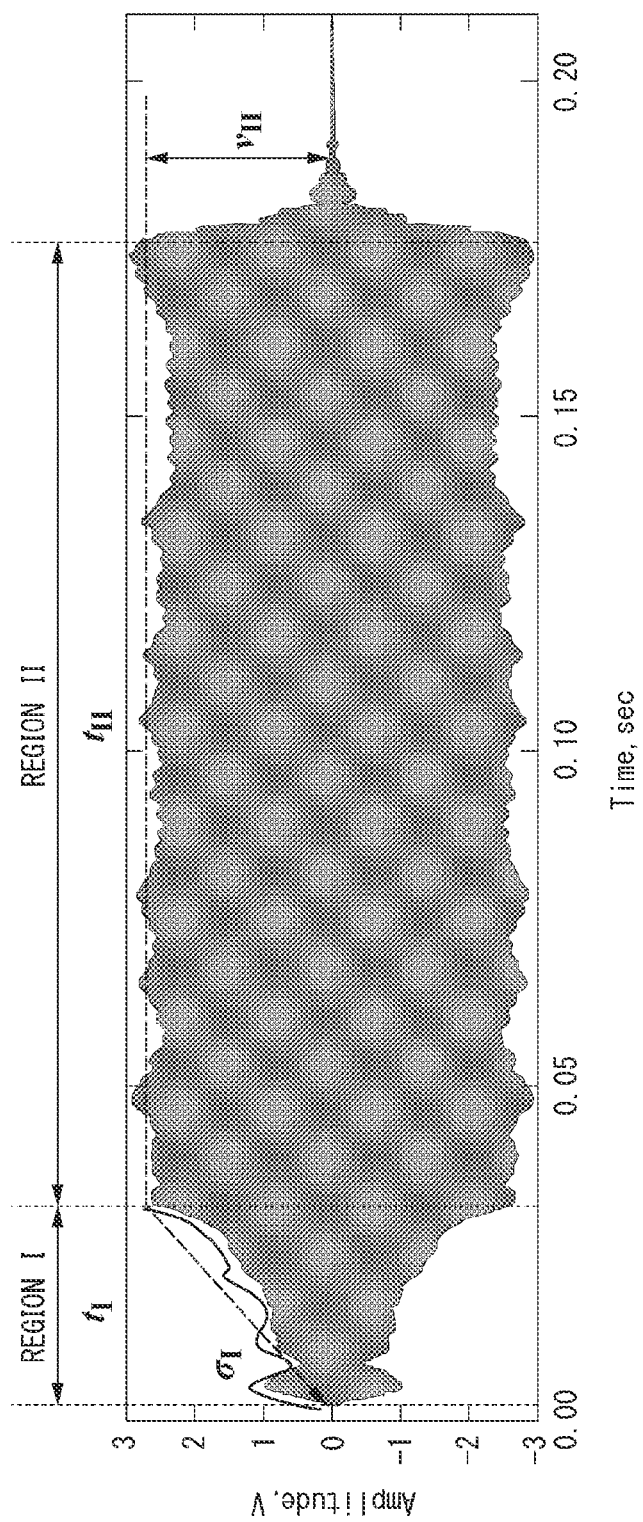
FIG. 5 is a diagram showing a detected signal waveform of the embodiment.

FIG. 5 shows a waveform based on a transmitted elastic wave signal measured by a sensor (for example, the first sensor S1 to the third sensor S3). As shown, an envelope that envelops the outer diameter of the amplitude is formed based on the signal waveform. The shape of the envelope of the signal waveform is classified into a first region I which gradually increases with time from the start of ultrasonic input, and a second region II which is continuous with the first region I and becomes a substantially constant value with time. The first region I shows, for example, a process over time in which the void d existing between the joint surfaces W1 decreases from the micron order to about 10 nm (see FIGS. 2 and 3).

The second region II shows, for example, a state in which the void d reaches a region from 10 nm to the interatomic distance (on the order of subnm) required for joining (see FIGS. 2 and 3). That is, the shape of the envelope formed by the signal waveform shows the welding process itself over time based on ultrasonic waves. A plurality of features appear in the shape of the envelope. As the feature amounts, parameters such as a time $t_I$ of the first region I, a time $t_{II}$ of the second region II, an amplitude $v_{II}$ after saturation, a variance $\sigma$ after removing the increasing trend in the first region I, an envelope variance $\sigma_2$ in the second region II, and an area E of the envelope are extracted.

As the feature amount, variation coefficients $\sqrt{(\sigma_2)}/v_n$, $\sqrt{(\sigma_2)}/v_{II}$, or the like, which are obtained by dividing the square root of the variance and the mean value or the amplitude $v_{II}$, may also be used. The feature amount is not limited to the above, and each parameter may be combined by calculation, or may be arbitrarily scaled. As the feature amount, any parameter may be used as long as the process of ultrasonic welding over time can be extracted in the envelope of the signal waveform.

Figure 6:
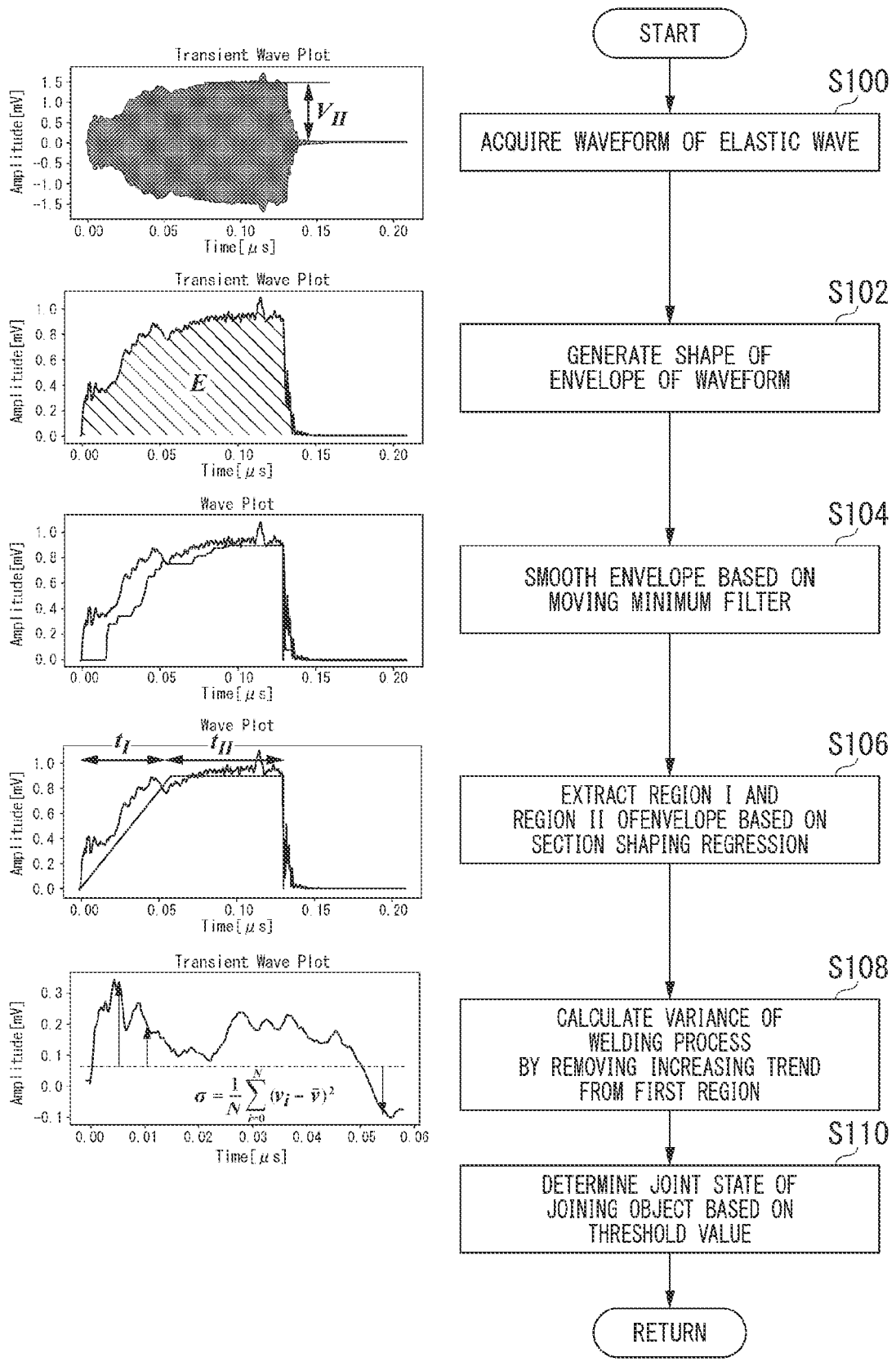
FIG. 6 is a flowchart showing a flow of a process for determining a joint state of a joint surface of the embodiment.

FIG. 6 shows a flow of processing for calculating a feature amount based on a detected value of a signal waveform, which is executed by the inspection device 10. The determination portion 12 acquires the waveform of the elastic wave propagating through the object W to be joined based on the detected values of the sensors (S1 to S3) (step S100). The determination portion 12 calculates the maximum amplitude $V_{II}$, which is a feature amount, based on the acquired waveform. For example, the determination portion 12 passes the detected value through a bandpass filter whose center frequency is set based on the transmission frequency of ultrasonic waves. For example, the determination portion 12 extracts the positive side of the signal based on the elastic wave that has passed through the bandpass filter, passes the extracted signal through the lowpass filter, and generates the shape of the envelope (step S102). The determination portion 12 calculates the area of the shape of the generated envelope and calculates the energy E, which is a feature amount.

The determination portion 12 passes the generated envelope data through the movement minimum value filter, removes noise, and smoothes it (step S104). The determination portion 12 performs interval linear regression on the smoothed envelope, and extracts the first region I, which gradually increases with time in the shape of the envelope, and the second region II, which is continuous with the first region and becomes a substantially constant value over time (step S106). The determination portion 12 calculates the elapsed time $t_I$ in the first region I and the elapsed time in in the second region II as feature amount. The determination portion 12 calculates an increasing trend (slope) in the first region I based on the interval linear regression. The determination portion 12 removes the increasing trend from the envelope data in the first region, and calculates the variance of the welding process, which is a feature amount, based on the envelope data after removing the increasing trend (step S108). The determination portion 12 compares the calculation result with a preset threshold value, and determines whether the joint state of the object W to be joined is good or defective (step S110). The threshold value is set, for example, based on the feature amount database under the abnormal mode generation condition acquired in advance.

Figure 7:
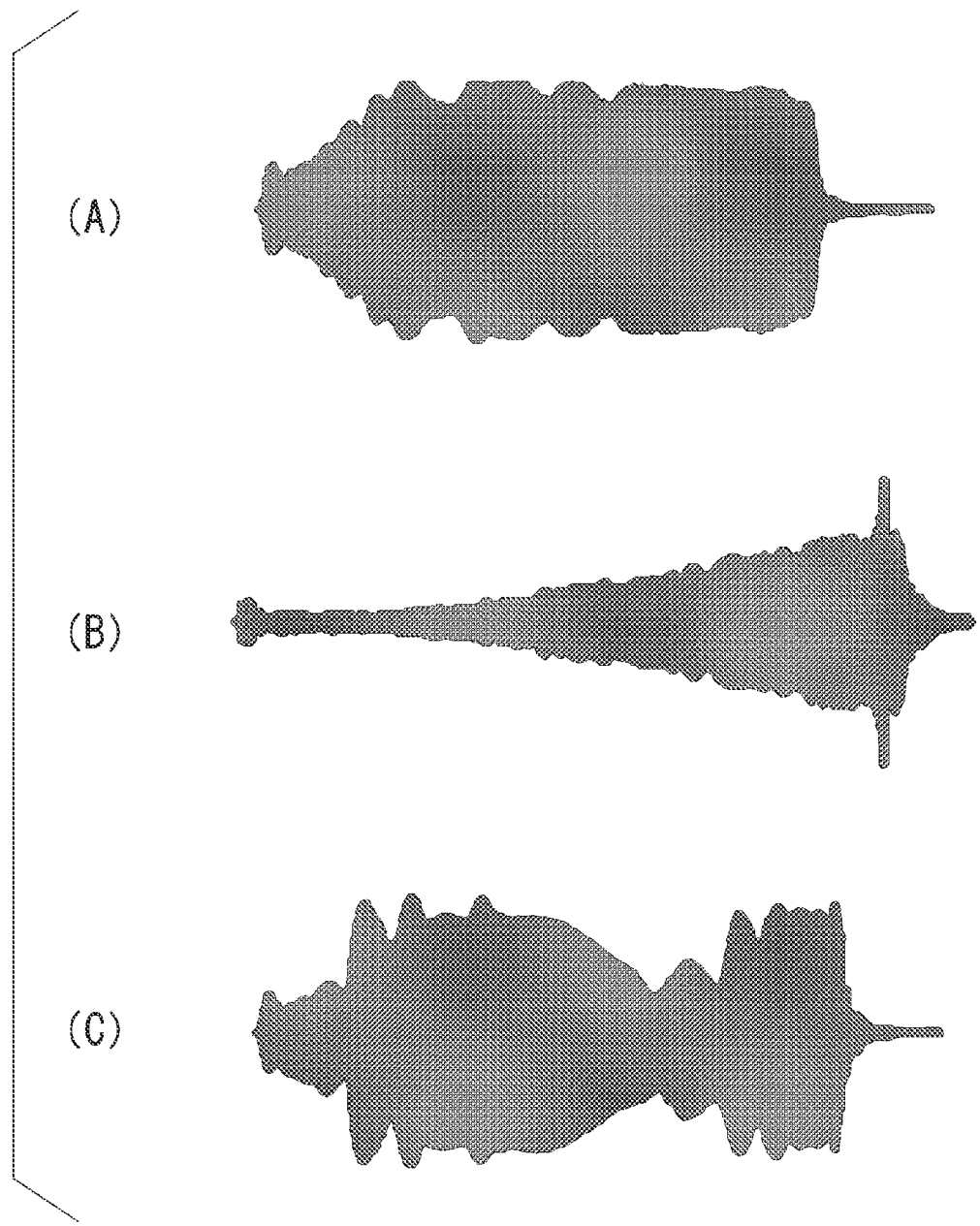
FIG. 7 is a diagram showing an example of a signal waveform showing various joint states of the joint surface of the embodiment.
Figure 8:
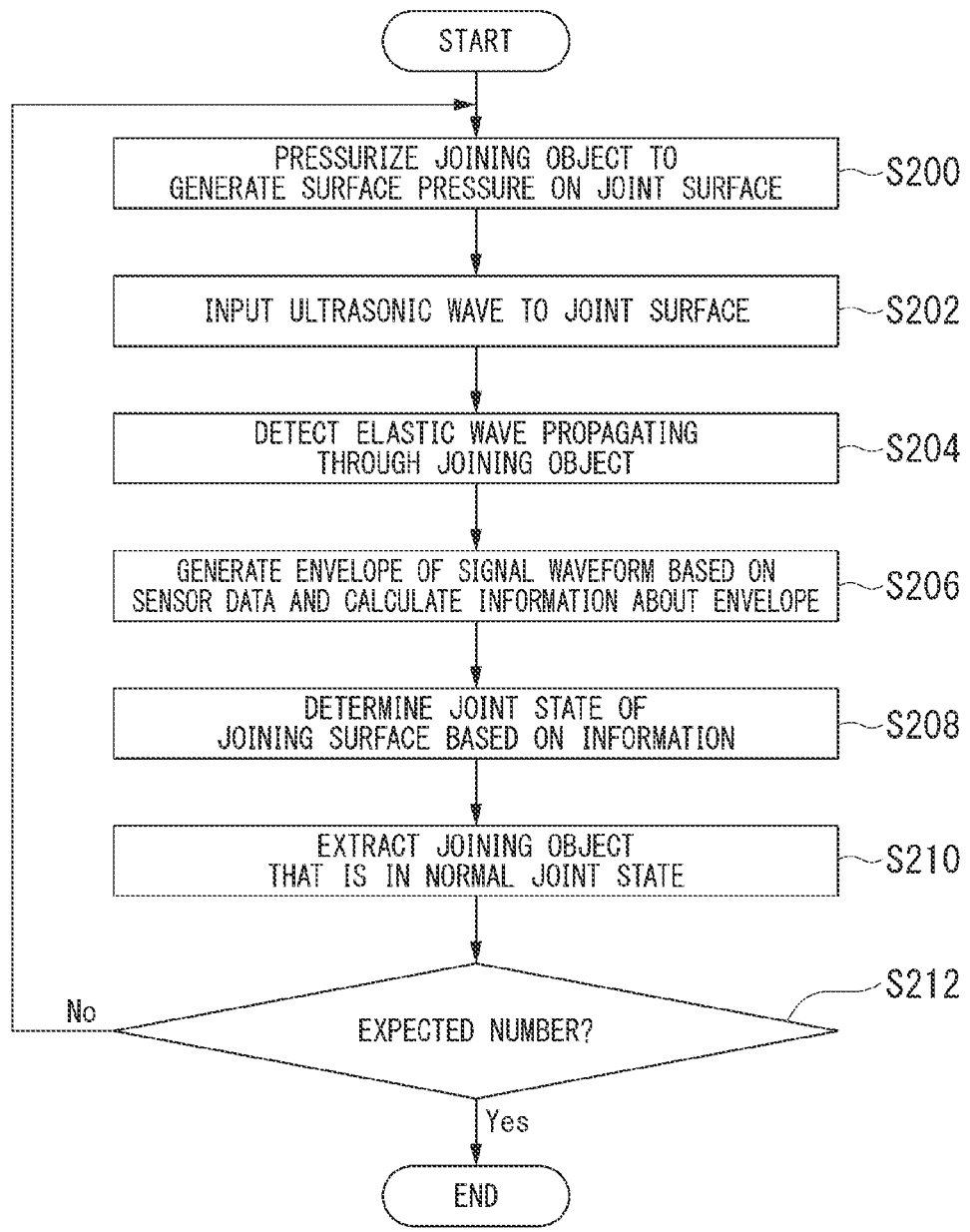
FIG. 8 is a flowchart showing a flow of processing executed in a method for manufacturing an ultrasonic welding member according to the embodiment.

As shown in FIG. 7, the waveform shape of the signal waveform changes based on the state of the object W to be joined. As shown in FIG. 7(A), when the object W to be joined is normal and the joint state is normal, the envelope of the signal waveform data has a characteristic shape in which the first region and the second region are distinguished. As shown in FIG. 7(B), when the joint surface W1 is contaminated with oil or fat even though the object W to be joined is normal, the shape of the envelope is abnormal. In this case, the interface of the joint surface W1 slips, which makes it difficult for welding to proceed, the envelope of the signal waveform has a shape that increases with time, and the first region and the second region shapes do not appear. As shown in FIG. 7(C), when the object W to be joined has an abnormality such as breakage, the envelope of the signal waveform has a shape in which the normal feature amount does not appear.

The threshold value used for determining whether the welding of the joint surface W1 of the object W to be joined at the end of welding is normal or abnormal is set based on the feature amount of the signal waveform based on each cause of the above-mentioned abnormality. The determination portion 12 compares, for example, the threshold value of the feature amount set in advance for any cause such as position shift, breakage, and contamination of the object W to be joined with the calculated feature amount, and determines whether the joint state of the joint surface W1 is good or defective based on the comparison result.

The determination portion 12 may not only calculate the feature amount, but also generate an image of the acquired waveform shape, and determine the abnormality mode of the object W to be joined based on the image. For example, the determination portion 12 may use an image of the envelope line corresponding to the joint state as teacher data, perform machine learning in advance using a neural network on the relationship between the shape of the image and the joint state, and determine the abnormal mode of the joint state of the object W to be joined based on the image of the waveform shape generated based on the acquired sensor data. The determination portion 12 may perform machine learning in advance based on the teacher data regarding the envelope corresponding to the joint state, output at least one of the joint state, the joint strength, and the waveform feature amount of the envelope based on the signal detected by the sensor, and determine the abnormal mode of the joint state of the object W to be joined.

In this case, the determination portion 12 may determine the joint state of the object W to be joined based on the signal waveform of the reflected wave of the elastic wave acquired from the fourth sensor S4. The determination portion 12 may determine the joint state of the object W to be joined by using the signal waveform data acquired from the fourth sensor S4 alone, or may use the data for a complementary determination of the joint state of the object W to be joined based on the signal waveform data acquired from the first sensor S3 to the third sensor S3.

The determination portion 12 may generate a display image including an envelope and display it on the display portion 16 together with information on the determination result. The display image may include, for example, at least one piece of information: a first region, a second region, a first time, a second time, an amplitude, a variance, and an area.

Next, a method of manufacturing an ultrasonic welding member using the ultrasonic welding device 1 will be described. The inspection device 10 may be a control device that not only determines the joint state of the object W to be joined (ultrasonic welding member) but also executes the processing of each step of ultrasonic welding in the ultrasonic welding device 1. Further, the inspection device 10 may perform ultrasonic welding in cooperation with a control device (not shown) separately provided in the ultrasonic welding device 1.

The inspection device 10 controls the drive portion 4 to drive the pressurizing portion 5 to apply a pressing force to the object W to be joined to generate a surface pressure on the joint surface W1 (step S200). The inspection device 10 controls the ultrasonic wave generator 3 and inputs ultrasonic waves to the joint surface (step S202). The inspection device 10 detects elastic waves propagating through the object W to be joined by at least one sensor at a plurality of different positions (step S204). The inspection device 10 generates an envelope of the signal waveform based on the analysis of the signal detected by the sensor, and calculates information such as a feature amount related to the envelope (step S206). The inspection device 10 analyzes the waveform of the envelope based on the feature amount.

The inspection device 10 determines the joint state on the joint surface based on the calculation result of the information (step S208). The inspection device 10 extracts the object W to be joined after joining, which is a normal joint state conforming to a preset threshold value based on the determination result (step S210). When the inspection device 10 extracts an abnormal object W to be joined that does not meet the threshold value, the inspection device 10 sends it to a line different from the line of the normal object W to be joined. The inspection device 10 counts the number of weldings, determines whether or not it has reached the planned number (step S212), and if it has not reached the planned number, returns the process to step S200, and if a positive determination is obtained, ultrasonic welding is finished.

As described above, according to the inspection device 10, it is possible to determine the joint state of the object W to be joined to be ultrasonically welded by the ultrasonic welding device 1. According to the inspection device 10, it is possible to determine the joint state of the object W to be joined and detect defective products in real time. According to the inspection device 10, by attaching a general-purpose product such as an AE sensor to the ultrasonic welding device 1, it is possible to determine the joint state of the object W to be joined, so that the device configuration can be simplified.

In the above embodiment, the determination portion 12 is a software function unit, but it may be a hardware function unit such as an LSI. A part or all of the determination portion 12 is realized by, for example, a processor such as a CPU executing a program (software) stored in the storage portion 14. Further, some or all of the functions of these components may be realized by hardware such as LSI, ASIC, FPGA, GPU (circuit unit: including circuitry), or may be realized by the cooperation of software and hardware. The program may be stored in a storage device such as an HDD or a flash memory in advance, or may be stored in a removable storage medium such as a DVD or a CD-ROM to be installed by attaching the storage medium to the drive device.

According to at least one embodiment described above, pressure is applied to the object to be joined so as to generate surface pressure on the joint surface of the object to be joined, ultrasonic waves are input to the joint surface, elastic waves propagating through the object to be joined are detected by at least one sensor at multiple different positions, an envelope is generated based on the analysis of the signal detected by the sensor, information about the envelope is calculated, and the computer executes the process of determining the joint state on the joint surface based on the calculation result, so that is possible to accurately inspect the joint state in real time in ultrasonic joining.

Although some embodiments of the present invention have been described, these embodiments are presented as examples and are not intended to limit the scope of the invention. These embodiments can be implemented in various other embodiments, and various omissions, replacements, and changes can be made without departing from the gist of the invention. These embodiments and variations thereof are included in the scope of the invention described in the claims and the equivalent scope thereof, and are included in the scope and gist of the invention. For example, the inspection device 10 may not only determine the joint state of the object W to be joined of one ultrasonic welding device 1, but also determine the joint state of the object W to be joined of a plurality of ultrasonic welding devices 1 connected through a network. The inspection device 10 may store the detection data and the determination result acquired from the plurality of ultrasonic welding devices 1, and execute machine learning at a predetermined timing to improve the determination accuracy.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover the forms and modifications that fall within the scope and spirit of the inventions.

What is claimed is:

1. An ultrasonic welding diagnostic method comprising:
applying a pressing force to an object to be joined so as to generate a surface pressure on a joint surface of the object to be joined;
inputting ultrasonic waves to the joint surface;
detecting an elastic wave propagating through the object to be joined by one or more sensors;
analyzing a signal detected by the one or more sensors to generate an envelope of the signal and calculating information about the envelope;
determining a joint state on the joint surface based on a calculation result of the information; and
extracting a first region that gradually increases with time in a shape of the envelope and a second region that is continuous with the first region and has a substantially constant value over time,
wherein the one or more sensors includes a first sensor and a second sensor, and the second sensor is provided separately from a first housing that supports the object to be joined, the second sensor being fixed to a fixed pedestal that mechanically contacts the first housing, and the second sensor detecting the elastic wave propagating on the pedestal.

2. An ultrasonic welding diagnostic method comprising:
applying a pressing force to an object to be joined so as to generate a surface pressure on a joint surface of the object to be joined;
inputting ultrasonic waves to the joint surface;
detecting an elastic wave propagating through the object to be joined by one or more sensors;
analyzing a signal detected by the one or more sensors to generate an envelope of the signal and calculating information about the envelope;
determining a joint state on the joint surface based on a calculation result of the information; and
extracting a first region that gradually increases with time in a shape of the envelope and a second region that is continuous with the first region and has a substantially constant value over time,
wherein the one or more sensors includes a first sensor and a second sensor, and the second sensor is provided separately from a pressurizing portion that pressurizes the object to be joined and generates the surface pressure on the joint surface, the second sensor being fixed to a second housing that mechanically contacts the pressurizing portion, and the second sensor detecting the elastic wave propagating from the pressurizing portion to the second housing.

3. The ultrasonic welding diagnostic method according to claim 1, further comprising:
extracting at least one of a first time elapsed in the first region, a second time elapsed in the second region, an amplitude of the signal in the second region, a variance after removing an increasing trend in the first region, and a feature amount including an area of the envelope.

4. The ultrasonic welding diagnostic method according to claim 3, further comprising:
separating the first region and the second region based on a linear regression analysis performed for each section.

5. The ultrasonic welding diagnostic method according to claim 3, further comprising:
calculating the shape of the envelope based on the signal based on the elastic wave that has passed through a bandpass filter whose center frequency is set based on a transmission frequency of the ultrasonic wave.

6. The ultrasonic welding diagnostic method according to claim 3, further comprising:
comparing a calculation result with a preset threshold value to determine whether the joint state is good or defective.

7. The ultrasonic welding diagnostic method according to claim 6, further comprising:
determining that the joint state is defective based on any of causes of misalignment, breakage, and contamination of the object to be joined.

8. The ultrasonic welding diagnostic method according to claim 6, further comprising:
comparing the calculation result with the preset threshold value to determine a joint strength at the joint surface.

9. The ultrasonic welding diagnostic method according to claim 8, further comprising:
executing machine learning based on teacher data related to the envelope corresponding to the joint state in advance; and outputting at least one of the joint state, the joint strength, and waveform feature amount of the envelope based on the signal detected by the one or more sensors.

10. The ultrasonic welding diagnostic method according to claim 3, further comprising:
generating a display image including the envelope to display on a display portion.

11. The ultrasonic welding diagnostic method according to claim 10, wherein the display image includes at least one of the first region, the second region, the first time, the second time, the amplitude, the dispersion, and the area.

12. The ultrasonic welding diagnostic method according to claim 1, further comprising:
changing at least one of control parameters including a welding time at input of the ultrasonic wave, output amount, and adjustment amount of the pressing force at input of the surface pressure, based on a determination result of the joint state.

13. A joining method of a welding member in which a computer executes the steps of;
applying a pressing force to an object to be joined so as to generate a surface pressure on a joint surface of the object to be joined;
inputting an ultrasonic wave to the joint surface;
detecting an elastic wave propagating through the object to be joined by one or more sensors;
analyzing a signal detected by the one or more sensors to generate an envelope of the signal, and calculating information about the envelope;
determining a joint state on the joint surface based on a calculation result of the information;
extracting the object to be joined after joining, which is the joint state that meets a predetermined threshold value based on a determination result; and
extracting a first region that gradually increases with time in a shape of the envelope and a second region that is continuous with the first region and has a substantially constant value over time,
wherein the one or more sensors includes a first sensor and a second sensor, and the second sensor is provided separately from a first housing that supports the object to be joined, the second sensor being fixed to a fixed pedestal that mechanically contacts the first housing, and the second sensor detecting the elastic wave propagating on the pedestal.

14. An inspection device for ultrasonic welding in which a pressing force is applied to an object to be joined so as to generate a surface pressure on a joint surface of the object to be joined, an ultrasonic wave is input to the joint surface, and an elastic wave propagating through the object to be joined is detected by one or more sensors, the inspection device comprising:
a determination portion that generates an envelope of a signal detected by the one or more sensors based on analysis of the signal, calculates information about the envelope, determines a joint state on the joint surface based on a calculation result of the information, extracts the object to be joined after joining, which is the joint state that meets a predetermined threshold value based on a determination result, and extracts a first region that gradually increases with time in a shape of the envelope and a second region that is continuous with the first region and has a substantially constant value over time,
wherein the one or more sensors includes a first sensor and a second sensor, and the second sensor is provided separately from a first housing that supports the object to be joined, the second sensor being fixed to a fixed pedestal that mechanically contacts the first housing, and the second sensor detecting the elastic wave propagating on the pedestal.

15. A non-transitory computer-readable storage medium having computer program instructions for ultrasonic welding in which a pressing force is applied to an object to be joined so as to generate a surface pressure on a joint surface of the object to be joined, an ultrasonic wave is input to the joint surface, and an elastic wave propagating through the object to be joined is detected by one or more sensors, the computer program instructions, when executed, causing a computer to:

analyze a signal detected by the one or more sensors;
generate an envelope of the signal based on an analysis result;
calculate information about the envelope;
determine a joint state on the joint surface based on a calculation result of the information;
extract the object to be joined after joining, which is the joint state that meets a predetermined threshold value based on a determination result; and
extract a first region that gradually increases with time in a shape of the envelope and a second region that is continuous with the first region and has a substantially constant value over time,
wherein the one or more sensors includes a first sensor and a second sensor, and the second sensor is provided separately from a first housing that supports the object to be joined, the second sensor being fixed to a fixed pedestal that mechanically contacts the first housing, and the second sensor detecting the elastic wave propagating on the pedestal.

16. A joining method of a welding member in which a computer executes the steps of;

applying a pressing force to an object to be joined so as to generate a surface pressure on a joint surface of the object to be joined;
inputting an ultrasonic wave to the joint surface;
detecting an elastic wave propagating through the object to be joined by one or more sensors;
analyzing a signal detected by the one or more sensors to generate an envelope of the signal and calculating information about the envelope;
determining a joint state on the joint surface based on a calculation result of the information;
extracting the object to be joined after joining, which is the joint state that meets a predetermined threshold value based on a determination result; and
extracting a first region that gradually increases with time in a shape of the envelope and a second region that is continuous with the first region and has a substantially constant value over time,
wherein the one or more sensors includes a first sensor and a second sensor, and the second sensor is provided separately from a pressurizing portion that pressurizes the object to be joined and generates the surface pressure on the joint surface, the second sensor being fixed to a second housing that mechanically contacts the pressurizing portion, and the second sensor detecting the elastic wave propagating from the pressurizing portion to the second housing.

17. An inspection device for ultrasonic welding in which a pressing force is applied to an object to be joined so as to generate a surface pressure on a joint surface of the object to be joined, an ultrasonic wave is input to the joint surface, and an elastic wave propagating through the object to be joined is detected by one or more sensors, the inspection device comprising:

a determination portion that generates an envelope of a signal detected by the one or more sensors based on analysis of the signal, calculates information about the envelope, determines a joint state on the joint surface based on a calculation result of the information, extracts the object to be joined after joining, which is the joint state that meets a predetermined threshold value based on a determination result, and extracts a first region that gradually increases with time in a shape of the envelope and a second region that is continuous with the first region and has a substantially constant value over time,
wherein the one or more sensors includes a first sensor and a second sensor, and the second sensor is provided separately from a pressurizing portion that pressurizes the object to be joined and generates the surface pressure on the joint surface, the second sensor being fixed to a second housing that mechanically contacts the pressurizing portion, and the second sensor detecting the elastic wave propagating from the pressurizing portion to the second housing.

18. A non-transitory computer-readable storage medium having computer program instructions for ultrasonic welding in which a pressing force is applied to an object to be joined so as to generate a surface pressure on a joint surface of the object to be joined, an ultrasonic wave is input to the joint surface, and an elastic wave propagating through the object to be joined is detected by one or more sensors, the computer program instructions, when executed, causing a computer to:

analyze a signal detected by the one or more sensors;
generate an envelope of the signal based on an analysis result;
calculate information about the envelope;
determine a joint state on the joint surface based on a calculation result of the information;
extract the object to be joined after joining, which is the joint state that meets a predetermined threshold value based on a determination result; and
extract a first region that gradually increases with time in a shape of the envelope and a second region that is continuous with the first region and has a substantially constant value over time,
wherein the one or more sensors includes a first sensor and a second sensor, and the second sensor is provided separately from a pressurizing portion that pressurizes the object to be joined and generates the surface pressure on the joint surface, the second sensor being fixed to a second housing that mechanically contacts the pressurizing portion, and the second sensor detecting the elastic wave propagating from the pressurizing portion to the second housing.

* * * * *